(12) United States Patent
Dondaine et al.

(10) Patent No.: US 11,248,655 B2
(45) Date of Patent: Feb. 15, 2022

(54) ROLLING BEARING WITH WIRE RACES

(71) Applicant: Aktiebolaget SKF, Gothenburg (SE)

(72) Inventors: Herve Dondaine, Avallon (FR); Arnaud Guerard, Fontenay-pres-Vezelay (FR); Joshua Oliveira, Lucy-sur-cure (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/096,410

(22) Filed: Nov. 12, 2020

(65) Prior Publication Data

US 2021/0190143 A1 Jun. 24, 2021

(30) Foreign Application Priority Data

Dec. 19, 2019 (DE) .......................... 102019220284.5

(51) Int. Cl.
*F16C 33/61* (2006.01)
*F16C 33/58* (2006.01)
*F16C 19/26* (2006.01)
*F16C 33/78* (2006.01)

(52) U.S. Cl.
CPC ............ *F16C 33/585* (2013.01); *F16C 19/26* (2013.01); *F16C 33/61* (2013.01); *F16C 33/7856* (2013.01); *F16C 2300/14* (2013.01)

(58) Field of Classification Search
CPC ........ F16C 19/26; F16C 33/585; F16C 33/61; F16C 33/7853; F16C 33/7856; F16C 2300/14
See application file for complete search history.

(56) References Cited

U.S. PATENT DOCUMENTS

| 3,478,402 | A | | 11/1969 | Schmude | |
|---|---|---|---|---|---|
| 4,126,361 | A | * | 11/1978 | Bottner | ................. F16C 19/381 384/455 |
| 4,422,697 | A | * | 12/1983 | Gugel | ................... F16C 19/381 384/452 |
| 4,828,405 | A | * | 5/1989 | Sinner | ..................... F16C 33/60 384/455 |
| 9,011,018 | B2 | | 4/2015 | Toda | |
| 9,541,136 | B2 | * | 1/2017 | Catalano | .............. F16J 15/3268 |
| 2019/0186543 | A1 | * | 6/2019 | Frank | .................... F16C 19/381 |

FOREIGN PATENT DOCUMENTS

DE 202014003963 U1 * 6/2014 ............... F16J 15/46
EP 3364061 A1 8/2018

* cited by examiner

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A rolling bearing having a first ring and second ring capable of rotating concentrically relative to one another, at least one first wire race mounted in the first ring, at least one second wire race mounted in the second ring, and at least one row of radial rollers radially interposed between raceways provided on the first and second wire races. The second ring provides at least two guide flanges to axially retain therebetween the row of radial rollers. The axial length of the raceway of the first wire race is greater than the axial length of the raceway of the second wire race.

20 Claims, 2 Drawing Sheets

ROLLING BEARING WITH WIRE RACES

CROSS-REFERENCE TO RELATED APPLICATIONS

This application claims priority to German Patent Application no. 102019220284.5, filed Dec. 19, 2019, the contents of which is fully incorporated herein by reference.

TECHNICAL FIELD OF THE INVENTION

The present invention relates to the field of rolling bearings. The invention notably relates to the field of rolling bearings, in particular large-diameter rolling bearings, that can accommodate at least radial loads, and having an inner ring and an outer ring arranged concentrically about an axis of rotation running in an axial direction.

BACKGROUND OF THE INVENTION

Such rolling bearing comprises generally two concentric inner and outer rings, and at least one row of rollers radially arranged between the rings.

The rolling bearing may also comprise inner and outer wire races respectively mounted in the inner and outer rings and delimiting inner and outer raceways for the row of radial rollers. Considering a radial plane of the rolling bearing, these inner and outer raceways are symmetric with regard to the rotation axis of the roller.

One of the inner and outer rings also comprises two integral guide flanges to axially retain therebetween the row of radial rollers. The rollers are not axially maintained relative to the other ring.

Currently, such a rolling bearing does not allow axial clearance since the rollers can axially move relative to the other ring. Accordingly, a manufacturer using the rolling bearing has to respect very accurate tolerances for bearing mounting on the structure frames.

One aim of the present invention is to overcome this drawback.

SUMMARY OF THE INVENTION

The invention provides a rolling bearing comprising a first ring and second ring capable of rotating concentrically relative to one another, at least one first wire race mounted in the first ring, at least one second wire race mounted in the second ring, and at least one row of radial rollers radially interposed between raceways provided on the first and second wire races.

The terms "radial rollers" is understood to mean rollers adapted to accommodate radial loads.

According to a general feature, the second ring comprises at least two guide flanges to axially retain therebetween the row of radial rollers.

According to another general feature, the axial length of the raceway of the first wire race is bigger than the axial length of the raceway of the second wire race.

Since the raceway of the wire race is bigger on the ring where the rollers are not axially maintained, wider axial tolerances are permissible for the rolling bearing while keeping enough contact on the rolling surface of the rollers.

Therefore, for a manufacturer using the rolling bearing, the machining tolerances of the structure frames can be increased. The rolling bearing capacity and the reliability are less impacted in case of high axial clearance.

To this end, the axial length of the raceway of the first wire race may also be bigger than the axial length of the radial rollers of the row.

Advantageously, the raceway of the first wire race may axially protrude outwards on each side of the radial rollers of the row.

In one embodiment, the first ring comprises at least one retaining rib extending into the radial space that exists between the first and second rings and extending towards the second ring, the retaining rib protruding radially relative to the raceway of the first wire race.

With such design, during manutention, transport and/or assembly of the bearing, an axial displacement of the first ring relative to the rollers and the second ring can be blocked in one direction by the axial contact between the rib and the rollers.

Accordingly, it is not necessary to use a temporary plate as it is the case with a conventional rolling bearing. As a matter of fact, currently, a temporary plate is axially mounted on one side of the rolling bearing and bolted on both rings in order to prevent such axial displacement. However, this conventional solution leads to use a temporary element which needs to be removed after mounting of the rolling bearing.

The retaining rib may have an annular form. Alternatively, the first ring may comprise a plurality of retaining ribs spaced apart in the circumferential direction.

The retaining rib(s) may extend from an axial cylindrical surface of the first ring from which is formed a groove, the first wire race being disposed inside the groove.

The retaining rib(s) may extend from the wall of the groove of the first ring into which the first wire race is disposed. Alternatively, the retaining rib(s) may be axially offset with regard to the wall of the groove.

The retaining rib(s) may be axially spaced from the radial rollers of the row.

In one embodiment, the retaining rib(s) and the first ring are made into one part. Alternatively, the retaining rib(s) may be made separately from the first ring and secured thereto.

In one embodiment, the guide flanges and the second ring are made into one part. Alternatively, the guide flanges may be made separately from the second ring and secured thereto.

In one embodiment, the guide flanges of the second ring may extend radially beyond the axes of rotation of the radial rollers of the row. Alternatively, the guide flanges may have a reduced radial dimension.

The rolling bearing may also comprise a cage for maintaining the regular circumferential spacing of the rollers.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
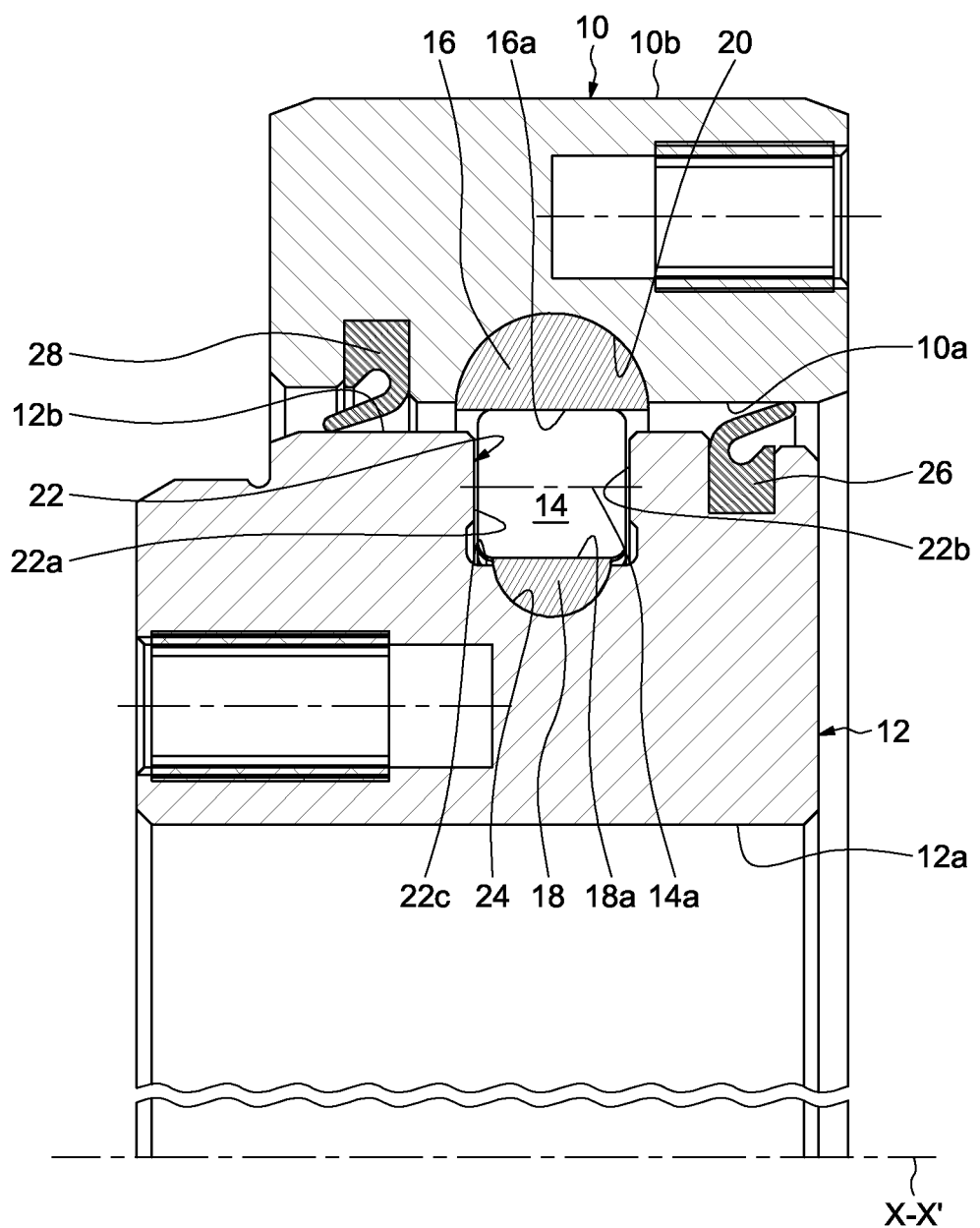
FIG. 1 is a partial cross-section of a rolling bearing according to a first example of the invention.

The rolling bearing as illustrated on FIG. 1 is a large-diameter rolling bearing comprising a first ring 10 and a second ring 12. In the illustrated example, the first ring 10 is the outer ring whereas the second ring 12 is the inner ring.

The outer and inner rings 10, 12 are concentric and extend axially along the bearing rotation axis X-X' which runs in an axial direction. The rings 10, 12 are of the solid type.

In the illustrated example, the rolling bearing comprises one row of radial rollers 14 which are arranged between the outer and inner rings 10, 12 in order to form a radial thrust.

The rollers 14 are identical to one another. Each roller 14 comprises a cylindrical outer rolling surface and two opposite frontal end surfaces axially delimiting the outer rolling surface. The axis 14a of rotation of each roller is parallel to the axis X-X' of the bearing.

The rolling bearing also comprises outer and inner wire races 16, 18, also named wire race rings, for the rollers which are respectively mounted in the outer and inner rings 10, 12. The wire races 16, 18 are formed from rolled wires whose ends are face to face.

The outer ring 10 comprises an inner cylindrical surface or bore 10a, and an outer cylindrical surface 10b which is radially opposite to the bore 10a. The outer ring 10 further comprises two opposite radial frontal surfaces (not referenced) which axially delimit the bore 10a and the outer surface 10b of the ring.

The outer ring 10 also comprises an annular groove 20 formed on the bore 10a and oriented radially inwards the inner ring 12. The groove 20 extends radially outwards from the bore 10a. The groove 20 has a toroidal form.

The outer wire race 16 is disposed within the groove 20 of the outer ring. The wire race 16 is continuous in the circumferential direction. The outer surface of the wire race 16 is of complementary shape to that of the groove 20. The wire race 16 is partly located inside the groove 20. As a matter of fact, in the illustrated example, the wire race 16 radially protrudes inwards with respect to the bore 10a of the outer ring.

The wire race 16 delimits an annular raceway 16a for the rollers 14. The raceway 16a comes into linear contact with the outer rolling surface of each roller 14. The raceway 16a is radially offset inwards with respect to the bore 10a of the outer ring. The raceway 16a is delimited by the bore of the wire race 16.

The inner ring 12 comprises an inner cylindrical bore 12a, and an outer cylindrical surface 12b which is radially opposite to the bore 12a. In the illustrated example, the outer cylindrical surface 12b has a stepped form. The inner ring 12 further comprises two opposite radial frontal surfaces (not referenced) which axially delimit the bore 12a and the outer cylindrical surface 12b.

The inner ring 12 also comprises an annular recess 22 formed on the outer surface 12b and oriented radially towards the outer ring 10. The recess 22 extends radially inwards from the outer surface 12b. The recess 22 radially faces the groove 20 and the wire race 16 of the outer ring.

The recess 22 is axially delimited by two annular side edges or walls 22a, 22b. The side walls 22a, 22b axially face each other. The side walls 22a, 22b are axially spaced apart from each other. The side walls 22a, 22b of the recess form integral guide flanges for the rollers 14 which axially retain therebetween the row of rollers 14. The side walls 22a, 22b are intended to come into axial contact with the frontal end faces of the rollers 14. The side walls 22a, 22b of the recess extends radially. In the disclosed embodiment, the side walls 22a, 22b extends radially beyond the axis 14a of each roller. The recess 22 also comprises an annular bottom 22c connected to the side walls 22a, 22b. The bottom 22c extends axially.

The inner ring 12 further comprises an annular groove 24 formed in the bottom 22c of the recess and oriented radially towards the outer ring 10. The groove 24 extends radially inwards from the bottom 22c. The groove 24 radially faces the groove 20 and the wire race 16 of the outer ring. The groove 24 has a toroidal form.

The inner wire race 18 is disposed within the groove 24 of the inner ring. The wire race 18 is continuous in the circumferential direction. The bore of the wire race 18 is of complementary shape to that of the groove 24. The wire race 18 is partly located inside the groove 24. As a matter of fact, in the illustrated example, the wire race 16 radially protrudes outwards with respect to the bottom 22c of the recess. The wire race 18 is entirely located inside the recess 22.

The wire race 18 delimits an annular raceway 18a for the rollers 14. The raceway 18a comes into linear contact with the outer rolling surface of each roller 14. The raceway 18a is radially offset inwards with respect to the outer surface 12b of the inner ring. The raceway 18a is delimited by the outer surface of the wire race 18.

The rollers 14 are radially interposed between the raceways 16a, 18a of the outer and inner wire races 16, 18. The outer rolling surface of each roller 14 comes radially into contact with the raceways 16a, 18a of the wire races.

The axial width of the inner wire race 18 is smaller than the axial length of the rollers 14. Thus, the axial length of the inner raceway 18a is also smaller than the axial length of the rollers 14. The rollers 14 are not in contact with the raceway 18a over their entire length.

The axial width of the outer wire race 16 is bigger than the axial width of the inner wire race 18. The axial length of the outer raceway 16a is bigger than the axial length of the inner raceway 18a.

In the illustrated example, the axial width of the outer wire race 16 is also bigger than the axial length of the rollers 14. The axial length of the outer raceway 16a is bigger than the axial length of the rollers 14. The rollers 14 are in contact with the raceway 16a over their entire length. Here, the outer raceway 16a axially protrudes outwards on each side of the rollers 14.

In the disclosed example, the rolling bearing further comprises on each side an annular seal 26, 28 respectively mounted on the outer and inner rings 10, 12 and provided to close the radial space that exists between these rings. This radial space is defined between the outer surface 12b of the inner ring and the bore 10a of the outer ring. A closed space is defined between the outer and inner rings 10, 12 and the seals 26, 28 in which the row of rollers 14 is disposed.

Figure 2:
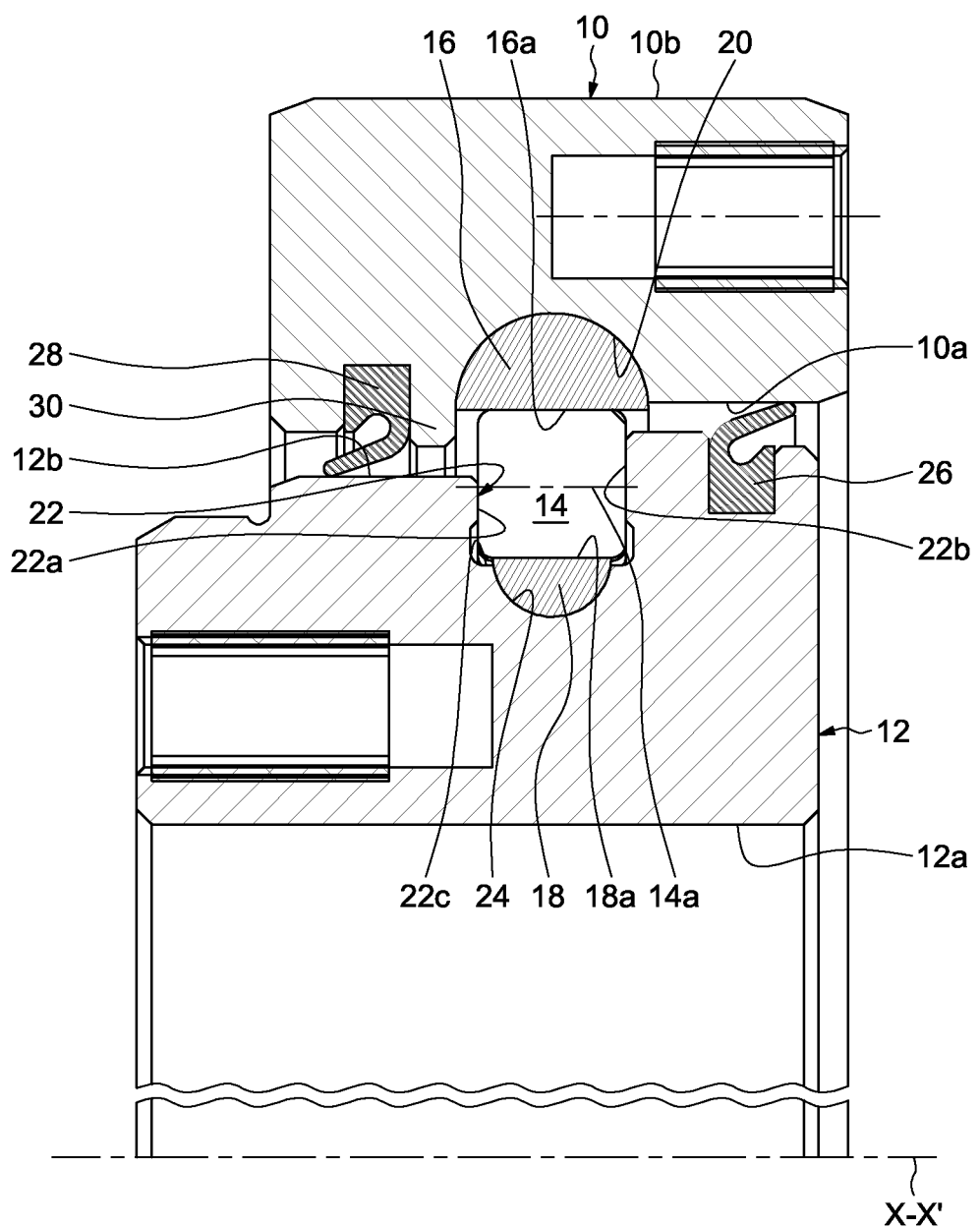
FIG. 2 is a partial cross-section of a rolling bearing according to a second example of the invention.

The example shown on FIG. 2, in which identical parts are given identical references, differs from the first example in that the outer ring 10 further comprises an annular shoulder or rib 30 extending into the radial space that exists between the outer and inner rings 10, 12 and extending towards the inner ring. The rib 30 protrudes radially relative to the raceway 16a of the outer wire race.

The rib 30 extends towards the outer surface 12b of the inner ring. The rib 30 remains radially spaced apart from the inner ring 12. The rib 30 extends from the bore 10a of the outer ring. The rib 30 extends radially. The rib 30 is axially spaced from the rollers 14. In the illustrated example, the rib 30 extends the wall of the groove 20 towards the inner ring 12. In this example, the radial dimension of the side wall 22a is smaller than the radial dimension of the side wall 22b since the wall 22a is located axially on the side of the rib 30 with regard to the row of rollers 14.

In this second example, during manutention, transport and/or assembly of the rolling bearing, an axial displacement of the outer ring 10 relative to the inner ring 12 is blocked in one direction by the axial contact between the rib 30 and the rollers 14.

Otherwise, with the design of the outer wire race 16 as shown in the first and second examples, the rolling bearing allows axial clearance since the length of the outer raceway 16a is bigger than the one of the inner raceway 18a of the inner wire race. In the illustrated example, the outer raceway 16a is also bigger than the length of the rollers 14 in order that the entire length of each roller 14 remains into contact with this raceway in case of axial displacement of the outer ring 12. Alternatively, it could however be possible to foresee a reduced length for the outer raceway 16a. For example, the axial length of the outer raceway 16a may be equal to the axial length of the rollers 14.

As previously mentioned, in these illustrated examples, the first ring of the rolling bearing is the outer ring 10 whereas the second ring is the inner ring 12.

As an alternative, it could be possible to provide a reversed arrangement with the first ring forming the inner ring and the second ring forming the outer ring. In this case, the guide flanges for the rollers are provided on the outer ring, and the wire race provided with the bigger raceway is mounted on the inner ring.

In the illustrated examples, the rolling bearing is provided with one row of radial rollers. Alternatively, the rolling bearing may comprise at least two rows of radial rollers, each row of radial roller being radially interposed between associated first and second wire races. In another variant, the rolling bearing may also comprise at one row of radial rollers radially interposed between first and second wire races, and at least one row of axial rollers axially interposed between wire races mounted in the inner and outer rings or between raceways directly formed on the rings.

The invention claimed is:

1. A rolling bearing having an axis of rotation, the rolling bearing comprising:
   a first ring and second ring capable of rotating concentrically relative to one another,
   at least one first wire race mounted in the first ring to form a first raceway which is parallel to the axis of rotation,
   at least one second wire race mounted in the second ring to form a second raceway, which is parallel to the axis of rotation, and
   at least one row of radial rollers radially interposed between raceways provided on the first and second wire races, each of the rollers in the at least one row of radial rollers having a roller axial width, the second ring comprising at least two guide flanges that axially retain the row of radial rollers disposed therebetween, wherein
   a first axial length of the first raceway is greater than a second axial length of the second raceway, the first axial length being greater than the roller axial width.

2. The rolling bearing according to claim 1, wherein the second axial width is less than the roller axial width.

3. The rolling bearing according to claim 2, wherein the first raceway axially protrudes outwards on each side of the radial rollers of the row.

4. The rolling bearing according to claim 1, wherein a retaining rib extends from an axial cylindrical surface of the first ring from which is formed a groove inside which the at least one first wire race is disposed.

5. The rolling bearing according to claim 4, wherein the retaining rib extends from a wall of the groove of the first ring.

6. The rolling bearing according to claim 1, wherein the guide flanges of the second ring extend radially beyond the axes of rotation of the radial rollers of the row.

7. The rolling bearing according to claim 1, wherein the first ring is an outer ring, and the second ring is an inner ring.

8. The rolling bearing according to claim 1, wherein the first ring, the second ring, and the at least one row of radial rollers are aligned only axially.

9. A rolling bearing comprising:
   a first ring and second ring capable of rotating concentrically relative to one another,
   at least one first wire race mounted in the first ring,
   at least one second wire race mounted in the second ring, and
   at least one row of radial rollers radially interposed between raceways provided on the first and second wire races, the second ring comprising at least two guide flanges that axially retain the row of radial rollers disposed therebetween, wherein
   the axial length of the raceway of the first wire race is greater than the axial length of the raceway of the second wire race, and wherein
   the first ring comprises at least one retaining rib extending into the radial space that exists between the first and second rings and towards the second ring, the retaining rib protruding radially relative to the raceway of the first wire race.

10. The rolling bearing according to claim 9, wherein the retaining rib is axially spaced from the radial rollers of the row.

11. The rolling bearing according to claim 9, wherein the retaining rib and the first ring are one part.

12. The rolling bearing according to claim 9, wherein the first ring, the second ring, and the at least one row of radial rollers are aligned only axially.

13. A rolling bearing comprising:
   a first ring comprising an outer ring,
   a second ring comprising an inner ring, the first ring and the second ring being capable of rotating concentrically relative to one another,
   at least one first wire race mounted in the first ring,
   at least one second wire race mounted in the second ring, and
   at least one row of radial rollers radially interposed between raceways provided on the first and second wire races, the second ring comprising at least two guide flanges that axially retain the row of radial rollers disposed therebetween, wherein
   the axial length of the raceway of the first wire race is greater than the axial length of the raceway of the second wire race.

14. The rolling bearing according to claim 13, wherein the axial length of the raceway of the first wire race is greater than the axial length of the radial rollers of the row.

15. The rolling bearing according to claim 14, wherein the raceway of the first wire race axially protrudes outwards on each side of the radial rollers of the row.

16. The rolling bearing according to claim 13, wherein a retaining rib extends from an axial cylindrical surface of the first ring from which is formed a groove inside which the at least one first wire race is disposed.

17. The rolling bearing according to claim 16, wherein the retaining rib extends from the wall of the groove of the first ring.

18. The rolling bearing according to claim 13, wherein the first ring, the second ring, and the at least one row of radial rollers are aligned only axially.

19. A rolling bearing having an axis of rotation, the rolling bearing comprising:
- a first ring and second ring capable of rotating concentrically relative to one another,
- at least one first wire race mounted in the first ring to form a first raceway which is parallel to the axis of rotation,
- at least one second wire race mounted in the second ring to form a second raceway, which is parallel to the axis of rotation,
- at least one row of radial rollers radially interposed between raceways provided on the first and second wire races, each of the rollers in the at least one row of radial rollers having a roller axial width, and
- wherein, when viewed in cross-section, the first raceway radially protrudes from a radially innermost surface of the first ring.

20. The rolling bearing according to claim 19, wherein the first ring, the second ring, and the at least one row of radial rollers are aligned only axially.

\* \* \* \* \*